United States Patent
Velayutham et al.

(10) Patent No.: US 10,827,093 B1
(45) Date of Patent: Nov. 3, 2020

(54) SYSTEMS AND METHODS FOR INTELLIGENT COPYING OF BOUND DOCUMENTS

(71) Applicant: XEROX CORPORATION, Norwalk, CT (US)

(72) Inventors: Saranraj Velayutham, Thanjavur (IN); Ramanathan Arunachalam, Chennai (IN); Kalai Selvi Subramaniam, Tirupur Dt (IN); Kavin Kumar Gurusamy, Erode (IN); Anand Babu, Chennai (IN); Shankar Durai, Vellore District (IN)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 16/443,930

(22) Filed: Jun. 18, 2019

(51) Int. Cl.
*H04N 1/387* (2006.01)
*H04N 1/00* (2006.01)
*G06F 3/12* (2006.01)
*H04N 1/203* (2006.01)

(52) U.S. Cl.
CPC ............ *H04N 1/387* (2013.01); *G06F 3/125* (2013.01); *G06F 3/1208* (2013.01); *H04N 1/00482* (2013.01); *H04N 1/2038* (2013.01)

(58) Field of Classification Search
None
See application file for complete search history.

(56) References Cited

U.S. PATENT DOCUMENTS

| | | | | |
|---|---|---|---|---|
| 5,798,841 A | * | 8/1998 | Takahashi | H04N 1/1017 358/296 |
| 6,055,036 A | * | 4/2000 | Takahashi | H04N 1/00795 116/234 |
| 2008/0002235 A1 | * | 1/2008 | Yamaguchi | H04N 1/387 358/443 |
| 2008/0244402 A1 | * | 10/2008 | Sakakibara | H04N 1/00408 715/708 |
| 2014/0198343 A1 | * | 7/2014 | Cho | G06F 3/1205 358/1.15 |
| 2015/0092228 A1 | * | 4/2015 | Okabayashi | G03G 15/502 358/1.15 |

* cited by examiner

*Primary Examiner* — Lennin R Rodriguezgonzalez

(57) ABSTRACT

The disclosure discloses methods and systems for intelligent copying of bound documents. The method includes receiving a selection of copying a bound document via a user interface. The user interface is presented to the user to input whether a starting page of the bound document for copying is a left-side page or a right-side page. Then, multiple pages of the bound document are scanned to generate corresponding scanned images. Finally, the generated scanned images are arranged in the same order as per the arrangement of pages in the original bound document.

25 Claims, 10 Drawing Sheets

COVERING ONE PAGE WITH BLANK SHEET TO SCAN ONLY ONE PAGE

FOLDING OF BOOK TO SCAN ONLY ONE PAGE

SYSTEMS AND METHODS FOR INTELLIGENT COPYING OF BOUND DOCUMENTS

TECHNICAL FIELD

The disclosed subject matter relates to the field of copying. More particularly, the disclosure relates to systems and methods for intelligent copying of bound documents.

BACKGROUND

A digital copier is a device that creates visually similar digital or paper copies of a printed document, and further includes a scanner, an image memory and a printer. A wide variety of documents can be scanned and printed by the photocopier. One such common and popular example is a book or a bound document. To create one or more copies, the digital copier uses an original document, which is placed on a platen or glass for copying. The scanner scans the document, generates image data from the scanned document, and stores the image data in the image memory. The printer prints the stored image data on a printing medium (e.g., paper/sheet). An image of each page may be printed on different sheets or on different sides of a single printing sheet.

The problem with the bound document is that they cannot be scanned using an input tray of a single pass document handler (SPDH) assembly. The input tray scans large number of unbound pages quickly. The pages placed on the input tray goes into the scanner one by one and are scanned rapidly and come out at the bottom of the SPDH. However, this mechanism cannot be used for scanning of the bound document since all pages are bound and cannot be separated. Instead, the book is spread open so that both pages are on the glass/platen and each page inside the book has to be turned manually and then scanned.

In analog photocopiers, both left and right-side pages of the book are scanned and are printed on one side of a single sheet. This means, every page in the scanned output document has two pages of the original document. So, the arrangement of the pages in the output document is different from that of the original document, which may lead to confusion and discomfort for the user. It is difficult to scan both the left and right-side pages of an open book simultaneously and have them printed on two separate sheets stacked in a consecutive manner. To overcome this problem, the user generally has to either bend the book in such a way that only one page is scanned at a time (as shown in a snapshot 210 of FIG. 2A) or cover one side of the book with a blank sheet 221 (as shown in a snapshot 220 of FIG. 2B) and scan the other page. This is a very time consuming and tedious process.

The present-day photocopiers can scan both left and right pages in the book simultaneously and separate the left and right images and print them separately. However, the present-day photocopiers do not have the ability to correlate the multiple successive copying and arrange each page in an order that resembles the original book. In an example, when a user wishes to make photocopies of a book of 100 pages, he may choose "book scanning" option, and an option "Both pages." In first scanning, only the right-side page is scanned, which is page number 1, and thus only single page number 1 is printed on a printing sheet. In the next scanning, page numbers 2 and 3 are scanned simultaneously, and are printed on either side of a single sheet. However, in the original book, page numbers 1 and 2 are on either side of a single sheet. So, the arrangement of the pages in the output document is different from that of the original book which may lead to confusion and discomfort for the user.

In another such scenario, the user chooses "book scanning" option, "separate page" and chooses "2 to 2" double side printing mode. On first scanning, the user chooses to scan only the right-side page which is page number 1. On the next scanning, pages 2 and 3 are scanned simultaneously. These two pages are printed on either side of a single sheet. On the next scanning, pages 4 and 5 are scanned simultaneously and then printed separately on either side of a single sheet. In this scenario also, the arrangement of pages is different compared to the original book. Therefore, there is a need for efficient methods and systems for copying the bound documents such that layout/arrangement of pages of the original book is maintained in the printed copy.

SUMMARY

According to aspects illustrated herein, a multi-function device for copying a bound document is disclosed. The multi-function device includes a memory for storing a computer readable program code. The multi-function device includes a controller for executing the computer readable program code to control the multi-function device, the computer readable program code being configured to cause the multi-function device to execute a process for receiving a selection of an option copying the bound document via a user interface of the multi-function device; automatically presenting the user interface to a user, to input if the starting page of the bound document for copying is a left-side page or a right-side page of the bound document; scanning the entire area of the bound document covering the left-side page and the right-side page to generate a scanned image; dividing the scanned image into a left-side scanned image and a right-side scanned image corresponding to the left-side page and the right-side page, respectively; and if the user input includes the starting page for copying is the right-side page of the bound document, execute the process in the following manner storing only the right-side scanned image; assigning the right-side scanned image a page number 1(n), where n has a value of 1; scanning a subsequent set of pages of the bound document to generate a subsequent scanned image; dividing the subsequent scanned image into a subsequent left-side scanned image and a subsequent right-side scanned image corresponding to the subsequent left-side page and the subsequent right-side page respectively; arranging the right-side scanned image and the subsequent left-side scanned image on either side of a single print medium, and the subsequent right-side scanned image on another print medium; and repeating the above process until the user finishes scanning the bound document. If the user input includes the starting page for copying is the left-side page of the bound document, execute the process in the following manner storing the left-side scanned image and the right-side scanned image; assigning the left-side scanned image a page number 1(n), where n has a value of 1; scanning a subsequent set of pages of the bound document to generate a subsequent scanned image; dividing the subsequent scanned image into a subsequent left-side scanned image and a subsequent right-side scanned image corresponding to the subsequent left-side page and the subsequent right-side page, respectively; and arranging only the left-side scanned image on a print medium, and the right-side scanned image and the subsequent left-side scanned image on either side of another print medium and the subsequent right-side scanned image on further another print medium;

and repeating the above process until the user finishes scanning the bound document. The controller is for generating a copy of the bound document such that the bound document includes all scanned images in the same order as in the bound document.

According to further aspects, a method is disclosed. The method includes receiving a selection of copying a bound document via a user interface of a multi-function device; automatically presenting the user interface to a user, to input if the starting page of the bound document for copying is a left-side page or a right-side page of the bound document; scanning the entire area of the bound document covering the left-side page and the right-side page to generate a scanned image; dividing the scanned image into a left-side scanned image and a right-side scanned image corresponding to the left-side page and the right-side page, respectively. If the user input includes the starting page for copying is the right-side page of the bound document, execute the process in the following manner storing only the right-side scanned image; assigning the right-side scanned image with a page number 1(n); scanning a subsequent set of pages of the bound document to generate a subsequent scanned image; dividing the subsequent scanned image into a subsequent left-side scanned image and a subsequent right-side scanned image corresponding to the subsequent left-side page and the subsequent right-side page, respectively; arranging the right-side scanned image and the subsequent left-side scanned image on either side of a single print medium, and the subsequent right-side scanned image side on another print medium; and repeating the above process until the user finishes the scanning. If the user input includes the starting page for copying is the left-side page of the bound document, execute the process in the following manner: storing the left-side scanned image and the right-side scanned image; assigning the left-side scanned image a page number 1(n), where n is 1; scanning a subsequent set of pages of the bound document to generate a subsequent scanned image; dividing the subsequent scanned image into a subsequent left-side scanned image and a subsequent right-side scanned image corresponding to the subsequent left-side page and the subsequent right-side page, respectively; and arranging the left-side scanned image on a single print medium, and the right-side scanned image and the subsequent left-side scanned image on either side of another print medium and the subsequent right-side scanned image on further another print medium; and repeating the above process until the user finishes scanning the bound document; generating a copy of the bound document such that the bound document includes all scanned images in the same order as in the original bound document.

According to additional aspects illustrated herein, a method is disclosed. The method includes receiving a selection of copying a bound document via a user interface. The user interface is automatically presented to the user to input whether a starting page of the bound document for copying is a left-side page or a right-side page. Then, multiple pages of the bound document are scanned to generate corresponding scanned images. Finally, the generated scanned images are arranged in the same order as per the arrangement of pages in the bound document.

DESCRIPTION

Figure 1:
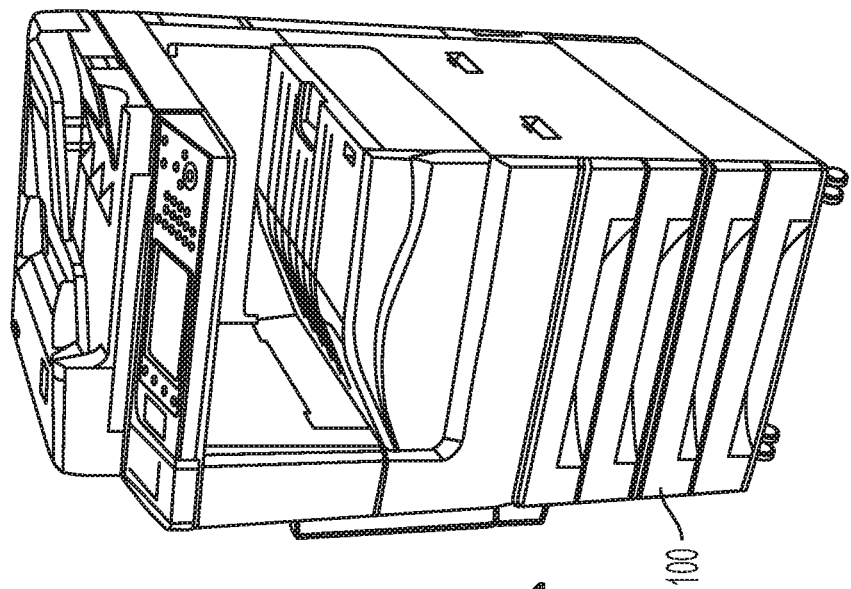
FIG. 1 illustrates an exemplary physical multi-function device for implementing the present disclosure.
Figure 1:
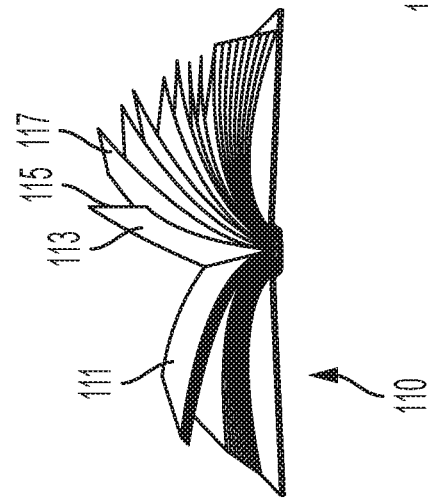
Figure 2B:
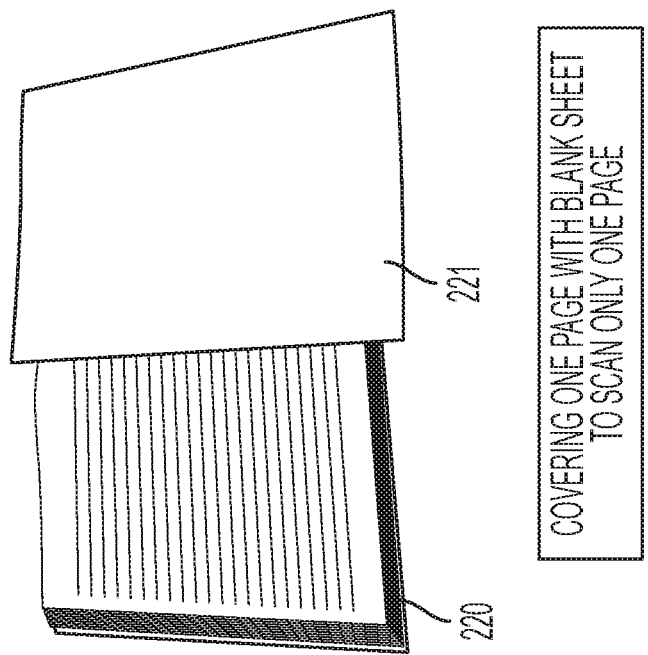
FIGS. 2A and 2B showcase how a bound document is placed for scanning, according to known solutions.
Figure 2A:
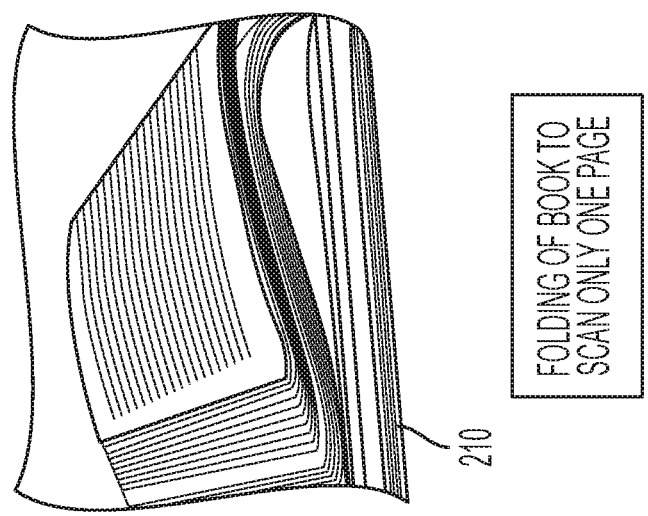

A few inventive aspects of the disclosed embodiments are explained in detail below with reference to the various figures. Embodiments are described to illustrate the disclosed subject matter, not to limit its scope, which is defined by the claims. Those of ordinary skill in the art will recognize a number of equivalent variations of the various features provided in the description that follows.

Non-Limiting Definitions

Definitions of one or more terms that will be used in this disclosure are described below without limitations. For a person skilled in the art, it is understood that the definitions are provided just for the sake of clarity and are intended to include more examples than just provided below.

The term "multi-function device" is a single device or a combination of multiple devices to perform more than one function such as, but not limited to, scanning, printing, copying, faxing, imaging, and so forth. The multi-function device may include software, hardware, firmware, and combination thereof. The multi-function device may interchangeably be used with the phrase "a copier," "a photo-copier," or "a digital copier." In the context of the current disclosure, the multi-function device scans a bound document and creates a copy of the bound document in a printed format. The copy of the bound document is created such that scanned pages (or images) are arranged in the same order as per the layout of the bound document. The multi-function device includes various components such as a platen, a scanner, a print engine, a user interface, a controller/processor, a memory, or any additional components required for implementing the current disclosure.

The term "copy" refers to a printed copy of the bound document, i.e., in a physical form, such as printed on paper. And copying includes all steps such as scanning, storing, processing/image processing, and printing, required for producing the printed version of the bound document.

The term "bound document" is defined to include a physical document in which all the pages are bound. One non-limiting example of the bound document may be a book. The bound document includes a left-side page and a right-side page. The left and right sides are pre-defined with respect to a user copying the bound document. The bound document includes a plurality of pages. Any bound document submitted for copying may also be referred to as an original bound document or an original document.

The term "layout" refers to the arrangement of the pages in the bound book. For example, a book has 5 pages and how these 5 pages are arranged is a part of layout of the bound book. Page number 1 is arranged on the left-side, page 2 on the right-side. On flipping, page 3 represents the left-side and pages 2 and 3 represent either side of a single page. Page 4 is the right-side and page 5 is the left-side but again represent either side of a single page. This whole arrangement is referred to as layout of the bound document.

The "starting page" refers to the page where the user wants to begin copying. The starting page may be a left-side page or a right-side page. For example, if a book includes 50 pages, the starting page may be page number 1, the starting page may be page numbers 10, 15, 21 or any other page from where the user wishes to begin scanning/copying.

The term "subsequent page" refers to the next set of pages placed on the platen for scanning after scanning a set of pages.

The term "scanned images" refer to pages of the bound book after scanning and may be termed as "scanned pages."

The term "print medium" refers to a medium on which the scanned images are printed. For example, the print medium may be a paper (also referred to as sheet) without limiting the scope of the disclosure. The paper has 2 sides. Various examples of paper types include, book paper, coated glossy paper magazines, etc.

The term "either side" refers to 2 sides of the print medium. On one side, one scanned image corresponding a page is printed and on the second side, another scanned image corresponding to another page of the bound document is printed.

The term "user interface" is defined to include an interface shown on the multi-function device and is operable by the user to perform functions such as change setting, check status, initiate scan, copy, or any other functions. The user interface enables the user to provide various inputs such as type of document, number of copies, color print or mono-color, print double-sided or single-sided, or the like. In the context of the current disclosure, the user interface receives an input from the user on the starting page of the book for copying.

Overview

The present disclosure discloses methods and systems facilitating photocopying of a bound document, particularly, intelligent scanning of the bound document. The intelligent scanning uses a smart scanning algorithm which enables a user to scan both left and right-side pages of the bound document simultaneously and print them on two sheets in a continuous manner and then have the sheets stacked in the same order as in the book. The scanning algorithm considers the position of the starting page, i.e., whether it is on the left-side or right side of the bound document and accordingly organizes scanned images in such a way that the final printed copy of the bound document is exactly same as the bound document. The methods and systems further provide a new dedicated option, i.e., "copy bound document" in a user interface for scanning and copying the bound document in a "Copy" menu in the user interface. Once this option is selected, the user can start to scan two pages at a time continuously.

The present disclosure proposes an improvised way of copying a bound document such as a book using a multi-function device or an equivalent device. The multi-function device produces a printed copy that has scanned pages arranged in the same manner as in the original bound document. This arrangement of the scanned pages in the printed copy adds convenience/comfort for the user when reading or referring to the printed copy. In operation, the improved methods and systems include a front-end feature and a back-end feature, the front-end feature provides a specific feature/option in a menu in a user interface for copying the bound document and the back-end feature includes execution by the multi-function device to copy the bound document such that the printed copy includes all scanned images/pages exactly in the same order as in the bound document as input. The present disclosure further improves the workflow of existing book scanning technology and reduces the steps needed to get the printed copy as output in the same order.

Exemplary Physical Multi-Function Device

FIG. 1 illustrates an exemplary physical multi-function device 100. The multi-function device 100 typically includes the functionality of printing, scanning copying, faxing, imaging or the like. The multi-function device 100 may be a single device incorporating all the functionalities as discussed or may be a combination of multiple devices such as a scanner, a printer, a copier, a fax machine, and so on. The multi-function device 100 may interchangeably be used with the term "a copier."

As further shown in FIG. 1 is a bound document 110 including multiple pages 111, 113, 115, and 117. Each page includes content in the form of text, image, graphics or a combination thereof. The pages may or may not include page numbers. The bound document 110 may include an index page or may not include an index page, but this does not interfere in the implementation of the present disclosure. When the bound document 110 is open, the document 110 includes a left-side page 111 and a right-side page 113. One of the pages 111 and 113 can be considered as a starting page for copying, depending upon an input from the user. The starting page is the page from where the user wishes to start scanning and/or copying the bound document 110. The page 115 is a subsequent left-side page of the bound document 110 and the page 117 is a subsequent right-side page of the bound document 110. As can be clearly seen, the page 111 is on a single sheet/paper, pages 113 and 115 are on either side of another sheet/paper and page 117 is on further another sheet. In the same manner, the bound document 110 can be described and understood completely. Upon scanning the pages 111, 113, 115, and 117 of the bound document 110, corresponding scanned images are created. For instance, after scanning the left-side page 111, a left-side scanned image is generated. Similarly, the right-side page 113 after scanning is referred to as a right-side scanned image, the subsequent left-side page 115 after scanning is referred to as a subsequent left-side scanned image, and the subsequent right-side page 117 after scanning is referred to as a subsequent right-side scanned image.

In operation, the multi-function device 100 creates a copy of the bound document 110 such as a book. Book is just one example, but the bound document 110 can be in the form a magazine, a notebook, spiral bound paper sheets, stapled paper sheets, filed paper sheets, and so on. The bound document 110 can be any document which is binded and each page has 2 sides. Here, copying the bound document 110 includes receiving the bound document 110 having multiple pages, scanning pages 111-117 of the bound document 110, generating scanned images corresponding to the pages 111-117, printing the scanned images on a print medium such as a paper. The print medium can be of any size such as A4, A3, A2 and so on as known in the art or later developed.

In context of the present disclosure, the multi-function device 100 arranges and prints the scanned images on the print medium that resembles the layout of the bound document 110. For example, if the page 111 represents the left-side page in the bound document 110, then a scanned image corresponding to the left-side page is on the left-side of a sheet in a printed copy. Similarly, scanned images corresponding to the right-side page and the subsequent left-side page are on either side of another single sheet in a printed version of the bound document 110. In the same way, scanned image corresponding to the subsequent right-side page is on right side on further another sheet. In this manner, the multi-function device 100 is able to correlates multiple successive copying and arrange each page in an order that resembles the bound document 110.

Exemplary Input and Output

Figure 3A:
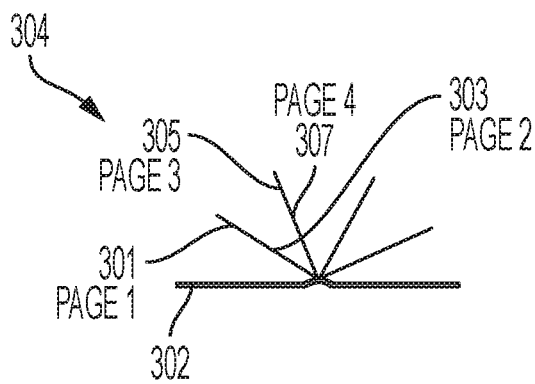
FIGS. 3A and 3B show an input provided for copying and an output generated according to known solutions. Similarly.
Figure 3B:
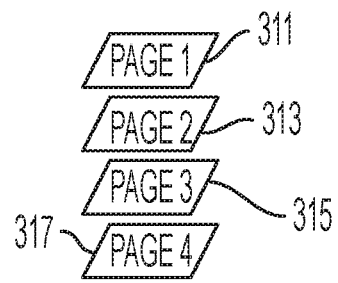
Figure 3C:
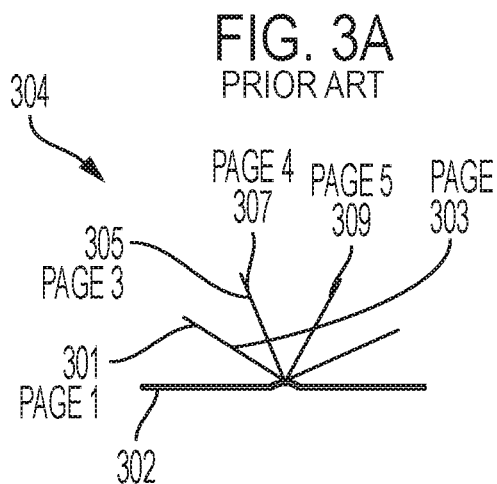
FIGS. 3C and 3D show an input provided for copying and an output generated according to existing solutions.
Figure 3D:
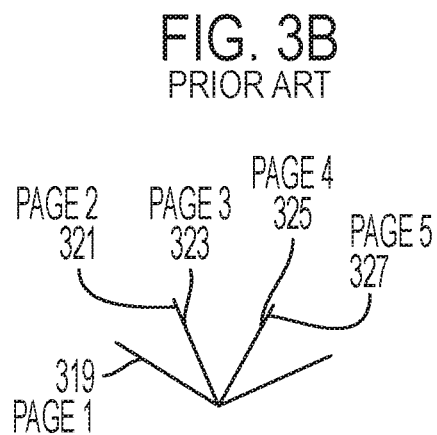
Figure 3E:
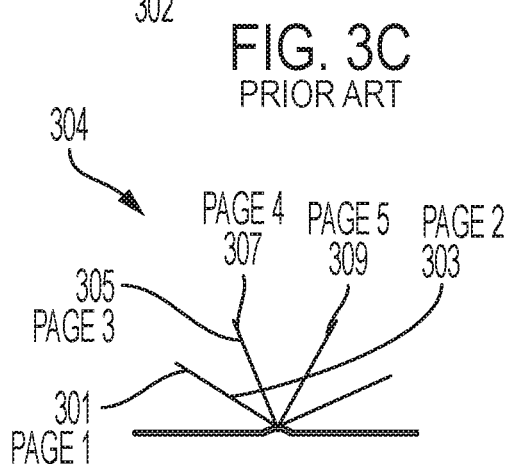
FIGS. 3E and 3F show an input submitted for copying and an output generated according to the implementation of the present disclosure.

For better understanding, a few exemplary case scenarios are discussed according to existing solutions and the present disclosure. In FIGS. 3A-3F, a book 304 and a platen 302 are shown using line diagrams. As shown in FIG. 3A, the book 304 includes multiple pages 301, 303, 305 and 307. As clearly seen, pages 301 (page number 1) and 303 (page number 2) represent either sides of a single page. Similarly, pages 305 (page number 3) and 307 (page number 4) represent either side of another page. When the book 304 is copied using the existing solutions and an option "separate pages," an output includes 4 scanned pages as 311, 313, 315 and 317 arranged on 4 different sheets, which is entirely different from the layout of the book 304 as depicted in FIG. 3B. In another example, (refer to FIG. 3C) when the book 304, i.e., pages 301, 303, 305, 307, and 309 are copied using the existing solutions but with an option "both pages," an output (refer to FIG. 3D) includes where page number 1 is printed on a separate sheet, pages 2 and 3 represent either sides of another sheet and pages 4 and 5 represent either sides of further another sheet. As shown in FIG. 3D, page 1 (319) is printed on a single sheet, pages 2 and 3 (321 and 323) are printed on another new sheet and pages 4 and 5 (325 and 327) are printed on another new sheet. And this is different from the layout of the input bound document 304, where pages 1 and 2 represent either side of the page, pages 3 and 4 represent either sides and so on. To summarize, as per FIG. 3B, output copies are printed in different sheets with one page in each sheet. In FIG. 3D, output copies are two-sided printed, but the first sheet has only one page printed on it and the rest of the pages are duplex printed and in a different order. According to existing the solutions, either pages are printed on separate sheets or they are printed in a different order.

Exemplary Input and Output According to Present Disclosure

Figure 3F:
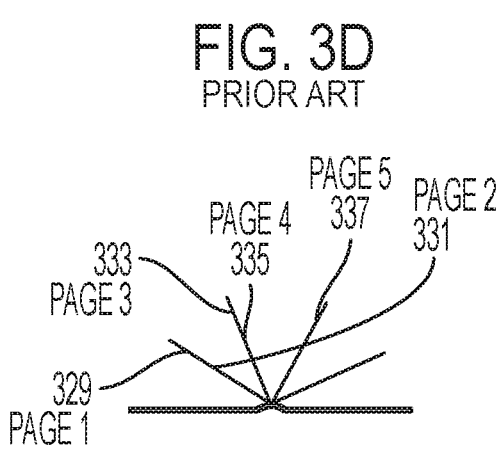

When the bound document 304 is copied (pages 301, 303, 305, 307 and 309) using the methods and systems of the present disclosure (refer to FIG. 3E), a printed copy is shown in FIG. 3F. The output printed copy according to the implementation of the present disclosure is exactly in the same order as the input bound document 304. For example, the printed copy includes pages 1 and 2 (329 and 331) arranged on either sides of a single sheet and pages 3 and 4 (333 and 335) printed/arranged on either sides of another sheet and page 5 (337) on further another sheet. The output shown in FIG. 3F clearly indicates that the printed copy includes all pages arranged in the same fashion as in the bound document 304. Pages which are on left-side are printed on left-side, and pages which are on right-side are printed on right side, and pages which represent either side of a sheet are printed in the same manner. The arrangement exactly same as the input document 304 is possible as the disclosure considers the position of the starting page of the document 304 to be copied and further establishes correlation between multiple successive copying in order to arrange each page resembling the bound document 304.

Exemplary Block Diagram

Figure 4:
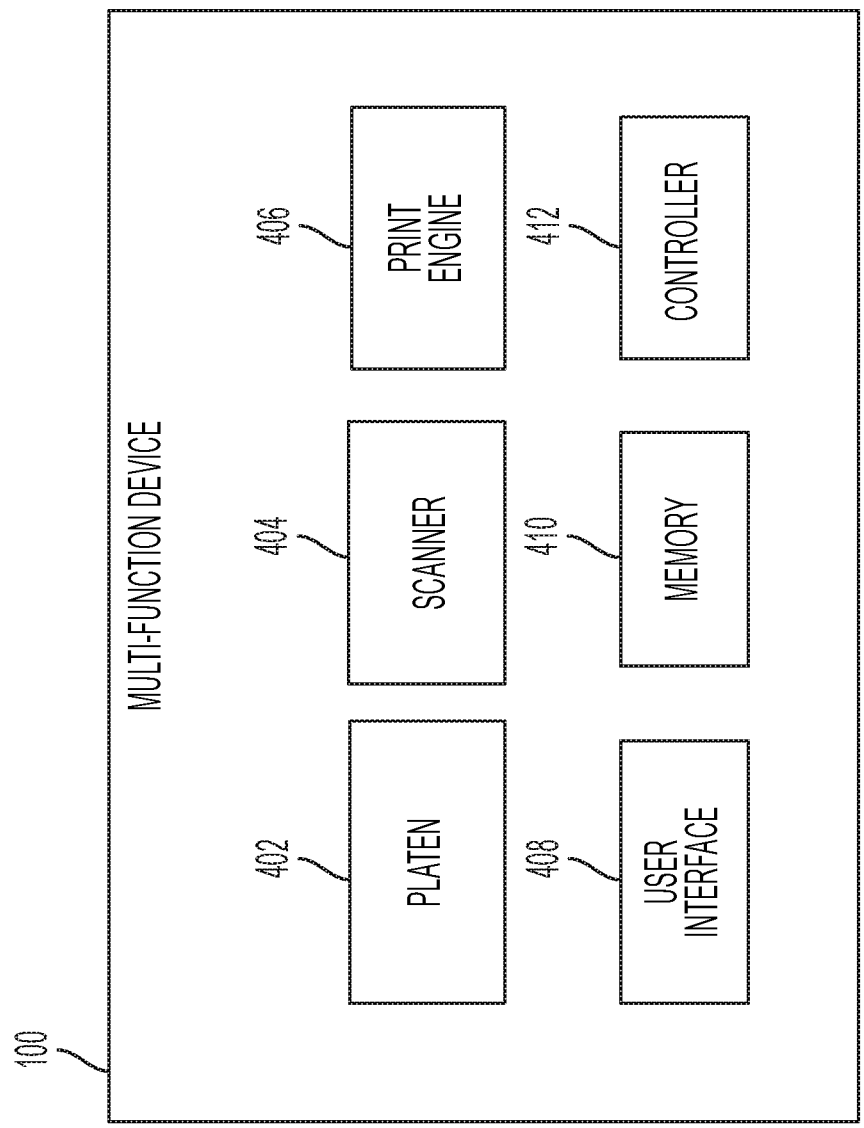
FIG. 4 illustrates an exemplary block diagram of a multi-function device, according to an embodiment of the disclosure.

FIG. 4 illustrates an exemplary block diagram of a multi-function device 100. The multi-function device 100 generates one or more copies of a bound document such as a book. The one or more copies include printed copies. The multi-function device 100 includes a platen 402 (also referred to as a glass), a scanner 404, a print engine 406, a user interface 408, a memory 410, and a controller 412. The multi-function device 100 may include a temporary memory (although not shown). The controller 412 interacts with all the components 402-410. The scanner 404 may be a flat-bed scanner, where a user of the bound book manually flips pages for scanning. The memory 410 stores a computer readable program code. The controller 412 executes the computer readable program code to control the multi-function device 100, the computer readable program code to cause the multi-function device 100 to execute a process for generating one or more copies of the bound document such that scanned pages are arranged in the same fashion as in the original bound document. More details on the execution will be discussed below.

An input provided to the multi-function device 100 includes a document in a physical form such as a bound document which is processed by the multi-function device 100. An output generated by the multi-function device 100 includes a printed copy of the bound document, the printed copy can be referred to by the user for reading or review purposes.

The user places the bound book on the platen 402 for scanning. The controller 412 detects the bound book on the platen 402 and automatically presents the user interface 408 to the user. The user provides an input via the user interface 408 of the multi-function device 400. The input includes selection of an option "copying a bound document" under "a copy menu" option provided in the user interface 408. The controller 412 receives the selection of copying the bound document via the user interface 408 of the multi-function device 100. The selection of the option enables the controller 412 to recognize that the user wishes to copy the bound document and accordingly triggers all components 402-410 and further ensures arrangement of pages in the printed copy is according to the layout of the input bound document. The user interface 408 includes all other options for copying the document such as settings, type of document, color print or mono-color print, etc. The user provides all required inputs through the user interface 408. The user interface 408 receives user input and displays one or more instructions/output to the user. Upon receiving the selection of the option for copying the bound document, the controller 412 automatically presents the user interface 408 to the user, to input if the starting page of the bound document for copying is a left-side page or a right-side page of the bound document.

Figure 5:
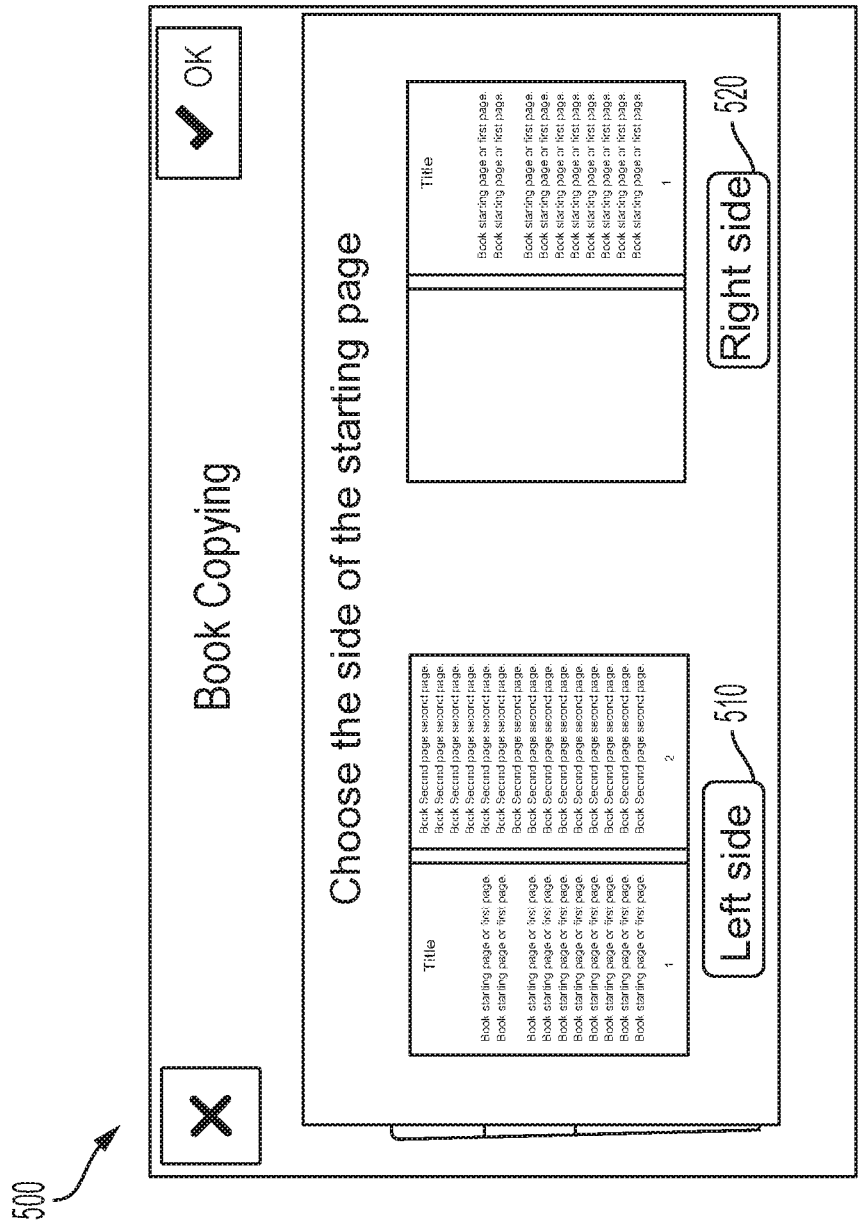
FIG. 5 illustrates an exemplary user interface indicating a user input required at the time of copying.

In context of the current disclosure, the controller 412 requests the user via the user interface 408 to provide an input whether the starting page for copying the bound document is a left-side page or a right-side page. The user provides the input and the controller 412 receives the input of the user. One such exemplary user interface 500 to provide the input is shown in FIG. 5. The user interface 500 displays an option for the user to choose whether the starting page is the left-side page or the right-side page. The user interface 500 is a touch-based user interface 500 and allows the user to choose one of the displayed options 510 and 520 option via a touch input. The user may select the option 510 if the starting page of the book is a left-side page. Similarly, the user may select the second option 520 if the starting page of the book is at right-side.

In some implementations, the controller 412 automatically detects whether the starting page for scanning is the left-side page or the right-side page. For instance, the controller 412 identifies that a page, for example, a left-side page, is a blank page then the controller 412 automatically considers the right-side page as the starting page for copying. In other cases, the left-side page may include an index page, which may not be required by the user so the controller 412 automatically considers the right-side page as the starting page for copying as the actual content begins from the right-side page. But in case the user requires the index page, the controller 412 considers the left-side page as the starting page. In other cases, where the user does not provide any input, the controller 412 considers the left-side page as the starting page by default.

After providing the input, the user places the bound document on the platen 402. The platen 402 may be a flat glass surface on which the users place the bound document for scanning/copying. The platen 402 is also called as flatbed. The platen 402 receives the bound document for copying. Specifically, the platen 402 receives one or more pages of the bound document for copying. The controller 412 detects the bound document on the platen 402 and triggers the scanner 404 to initiate scanning of the bound document placed on the platen 402. The user may place the bound document on the platen 402 before or after providing input via the user interface 408.

The scanner 404 initiates scanning and scans the entire area of the bound document covering the left-side page and the right-side page and generates a scanned image. The scanned image corresponds to a first set of pages placed on the platen 402 for scanning and is referred to as a first scanned image. The scanner 404 may include a contact image sensor which moves inside the platen 402 and captures the image data. This raw image data is processed by the controller 412, which then gets printed on a sheet by the print engine 406. The controller 412 then divides the scanned image into a left-side scanned image and a right-side scanned image corresponding to the left-side page and the right-side page, respectively. Any existing techniques may be used to divide the scanned image into the left-side scanned image and the right-side scanned image. For example, one technique may be scanning the pages twice fully and scanning half of the scanned size to differentiate between the left-side and right-side.

Figure 6A:
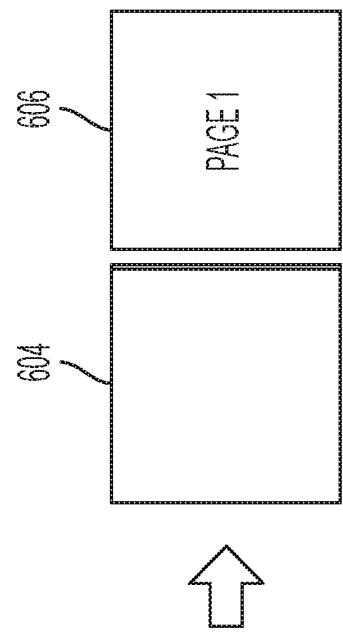
FIGS. 6A and 6B show exemplary scanned images generated at the time of scanning.
Figure 6A:
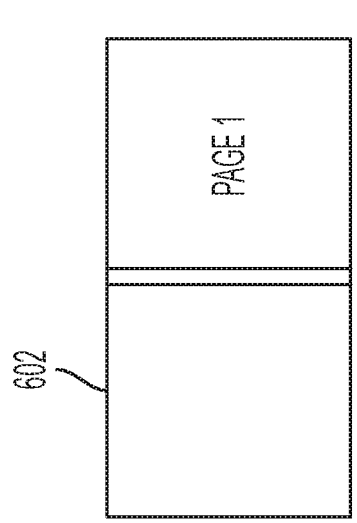
Figure 6B:
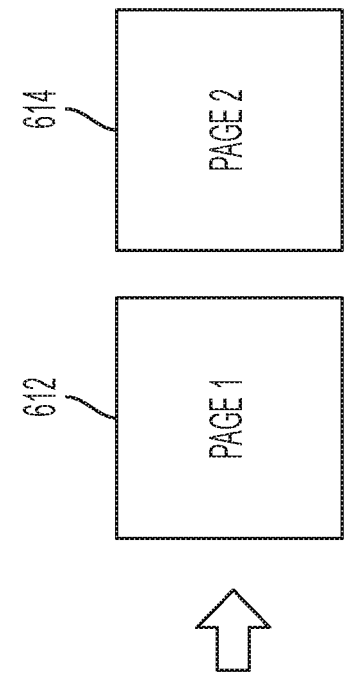
Figure 6B:
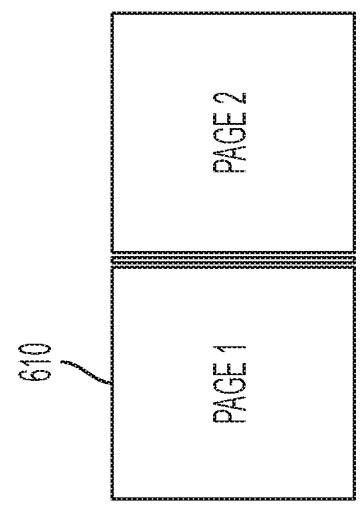

Referring to FIG. 6A, the scanned image is shown as 602. The controller 412 divides the scanned image into two halves such as a left-side scanned image 604 and a right-side scanned image 606. In FIG. 6B, another scanned image is shown as 610. The controller 412 divides the scanned image into two halves such as a left-side scanned image 612 and a right-side scanned image 614.

If the user input includes that the starting page for copying is the right-side page of the bound document, the method is executed in the following manner. The controller 412 stores only the right-side scanned image corresponding to the right-side starting page. The right-side scanned image is stored in the memory 410. And the controller 412 discards the left-side scanned image as the left-side scanned image is of no interest to the user. The controller 412 then assigns a page number 1(n) to the right-side scanned image, the value of n is an integer and the initial value is 1. Here, page number 1 is assigned to the right-side scanned image. The controller 412 assigns the page numbers to the subsequent scanned images in a consecutive manner and this will be discussed below.

Figure 7:
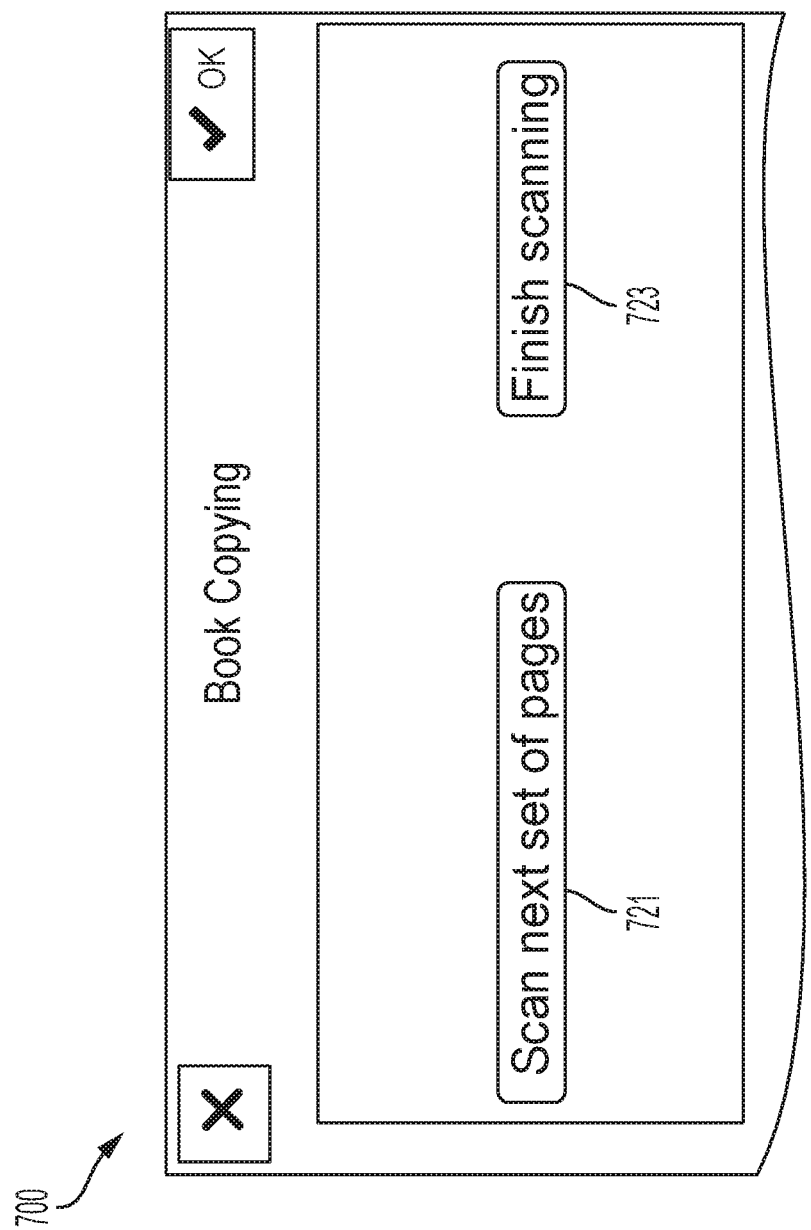
FIG. 7 illustrates another exemplary user interface indicating a user input required at the time of copying.

The controller 412 further displays the user interface 408 to the user whether he wishes to finish scanning or wishes to proceed with scanning a next set of pages. One such exemplary user interface 700 is shown in FIG. 7. The user interface 700 displays options 721 and 723 to the user for selection, the option 721 indicates scanning next set of pages and the option 723 indicates finish scanning. The user can choose any of the options 721 and 723 as required. Based on the user input, the controller 412 proceeds with further execution. If the user chooses the option 723, the controller 412 interacts with the print engine 406 for printing the right-side scanned image on a sheet. If the user chooses the option 721, the controller 412 triggers the scanner 404 for further scanning.

If the option 721 is selected, the controller 412 triggers the scanner 404 to further scan a next/subsequent set of pages of the bound document. The scanner 404 scans the subsequent set of pages and generates a subsequent scanned image. The controller 412 divides the subsequent scanned image into a subsequent-left side scanned image and a subsequent right-side scanned image corresponding to the subsequent left-side page and the subsequent-right side page, respectively. The scanner 404 transmits the subsequent left-side scanned image and the subsequent right-side scanned image to the controller 412. The controller 412 receives the subsequent left-side scanned image and the subsequent right-side scanned image and are stored in the memory 410. The controller 412 assigns the page numbers to the subsequent left-side scanned image and the subsequent right-side scanned image. The controller 412 assigns the right-side scanned image as page 1(n) and the subsequent left-side scanned image as page (n+1). The value of n is incremented whenever the user chooses to scan a new set of pages. Based on the above formula, the controller 412 assigns the subsequent left-side scanned image as page number 2 and the subsequent right-side scanned image as page number 3 and stores the pages 2 and 3 in the memory 410. The controller 412 again displays the user interface 700 to confirm if he wishes to finish scanning or wishes to proceed with scanning next set of pages. If the user selects the option 721, the steps of scanning, dividing, storing, assigning page numbers and the like are repeated until the user selects the option 723, i.e., finishes the scanning.

Before printing, the controller 412 arranges all the scanned images, i.e., the right-side scanned image, the subsequent left-side scanned image and the subsequent right-side scanned image. Here, the controller 412 arranges the subsequent left-side scanned image and the right-side scanned image on either side of a single sheet. The controller 412 arranges the subsequent right-side scanned image on a new sheet in a printed copy. The controller 412 passes all details to the print engine 406 for printing. The controller 412 interacts with the print engine 406 and organizes printing such that the print engine 406 prints the right-side scanned image and the subsequent left-side scanned image on either side of a sheet, and further the print engine 406 prints the subsequent right-side scanned image on another sheet. In this manner, the multi-function device 100 outputs the printed sheets exactly in the same manner as in the bound document submitted for copying.

The user collects the printed sheets and may bind using staple. Alternatively, the printed sheets are sent to a finishing unit (although not shown) in the multi-function device 100 and the finishing unit may bind the printed sheets as required but the finishing aspect does not interfere in the implementation of the present disclosure.

Continuing with the description above, If the user input includes that the starting page for copying is the left-side page of the bound document, the method is executed in the following manner. The controller 412 stores the left-side scanned image and the right-side scanned image. The left-side scanned image and the right-side scanned image are stored in the memory 410. The controller 412 then assigns a page number 1(n) to the left-side scanned image and assigns a page number page (n+1) to the right-side scanned image, the value of n is an integer, and the initial value is 1 and the value of n is incremented by 1. Here, page number 1 is assigned to the left-side scanned image and page number 2 is assigned to the right-side image. The controller 412 assigns the page numbers to the subsequent scanned images in a consecutive manner and this will be discussed below. Here, n is the page number of the previous page. For example, since the first page does not have any page before it, the value of n is 0. Accordingly, the page number for the first page is allotted based on=n+1, i.e., 0+1. For the second page, the page number is assigned based on=n+1, i.e., 1+1=2 (here, the value of n is the previous page number, which is 1). For the third page, the page number is assigned based on page number=n+1, i.e., 2+1=3, (here the value of n is the previous page number, which is 2). This process of assigning page number is continued as long as the user keeps scanning new pages.

The controller 412 further displays the user interface 408 to the user whether he wishes to finish scanning or wishes to proceed with scanning next set of pages. One such exemplary user interface 700 is shown in FIG. 7. The user interface 700 displays options 721 and 723 to the user for selection, the option 721 indicates scanning next set of pages and the option 723 indicates finish scanning. The user can choose any of the options 721 and 723 as required. Based on the user input, the controller 412 proceeds with further execution. If the user chooses the option 723, the controller 412 interacts with the print engine 406 for printing the right-side scanned image on the sheet.

If the option 721 is selected by the user, the controller 412 triggers the scanner 404 to further scan a subsequent set of pages of the bound document. The scanner 404 scans the subsequent set of pages and generates a subsequent scanned image. The controller 412 divides the subsequent scanned image into a subsequent-left-side scanned image and a subsequent right-side scanned image corresponding to the subsequent left-side page and the subsequent-right side page, respectively. The controller 412 receives the subsequent left-side scanned image and subsequent right-side scanned image and are stored in the memory 410. The controller 412 assigns the page number to the subsequent left-side scanned image and the subsequent right-side scanned image. Based on the above formula, the controller 412 assigns the subsequent left-side scanned image as page number 3 and the subsequent right-side scanned image as page number 4 and stores pages 3 and 4 in the memory 410. The controller 412 further displays the user interface 700 to confirm if he wishes to finish scanning or wishes to proceed with scanning next set of pages. If the user selects the option 721, the steps of scanning, dividing, storing, assigning page numbers and the like are repeated until the user selects the option 723, i.e., finishes the scanning.

Before printing, the controller 412 arranges all the scanned images, i.e., the left-side scanned image, the right-side scanned image, the subsequent left-side scanned image and the subsequent right-side scanned image for printing. The controller 412 arranges the scanned images in same order as in original book. The controller 412 uses the page number (generated by the formula) for arranging. Here, the controller 412 arranges the left-side scanned image on a sheet, the right-side scanned image and the subsequent left-side scanned image on either side of another sheet and the subsequent right-side scanned image on further another sheet. The controller 412 passes all details to the print engine 406 for printing. The controller 412 interacts with the print engine 406 and organizes printing such that the print engine 406 prints the left-side scanned image on a single sheet, the right-side scanned image and the subsequent left-side scanned image on either side of the another sheet, and further the print engine 406 prints the subsequent right-side scanned image on the further another sheet. In this manner, the multi-function device 100 outputs the printed sheets exactly in the same manner as in the bound document submitted for copying.

The user collects the printed sheets and may bind using staple. Alternatively, the printed sheets are sent to a finishing unit (although not shown) in the multi-function device 100 and the finishing unit may bind the printed sheets as required but the finishing part does not interfere in the implementation of the present disclosure.

As shown, the memory 410 further stores profiles of the user, user authentication data, credentials of the user or any other details. The memory 410 further stores computer readable program code that is executed by the controller 412 to control the operation of the multi-function device 100 and the components 402-410 of the multi-function device 100. The computer program with computer readable program code can be executed in many exemplary ways, such as an application that is resident in the memory 410 of the multi-function device 100 or as a hosted application that is being executed on a server and communicating with the device application or browser via a number of standard protocols, such as TCP/IP, HTTP, XML, SOAP, REST, JSON and other sufficient protocols. The disclosed computer programs can be written in exemplary programming languages that execute from the memory 410 on the multi-function device 100 or from a hosted server, such as BASIC, COBOL, C, C++, Java, Pascal, or scripting languages such as JavaScript, Python, Ruby, PHP, Perl or other sufficient programming languages. The disclosed computer programs can be implemented on non-transitory computer readable carriers adapted to allow the processor to execute the program code. In the context of the current disclosure, the computer readable program code causes the multi-function device 100 to execute a process of generating one or more copies of the bound document in a manner such that the printed copies of the bound document are arranged in the same order as in the bound document.

In one implementation, the system can be implemented in the form of a server (although not shown), where the server controls all the functionalities related to the multi-function device 100 as above. For example, scanning can be performed by the multi-function device 100 and the remaining functions such as receiving an input from the user on the starting page, displaying the user interface, organizing printing, assigning page numbers, storing the scanned image with page numbers as assigned etc. can be performed by the server. This is just one example; however, the server can be configured in any manner to implement the present disclosure.

Exemplary Scenario

In an example, if the user initially chooses that the starting page is the right-side, then pages 1 and 2 are printed on either sides of a single sheet and similarly the pages 3 and 4 are printed on either sides of another sheet and so on. If the user selects that the starting page is on the left-side of the book, then the page 1 alone is printed on one sheet, then the pages 2 and 3 are printed on either side of another sheet and pages 4 and 5 are printed on either side of further another sheet, and so on. Thus, the arrangement of printed sheets is in an order that resembles the original book.

Exemplary Flowcharts

Figure 8:
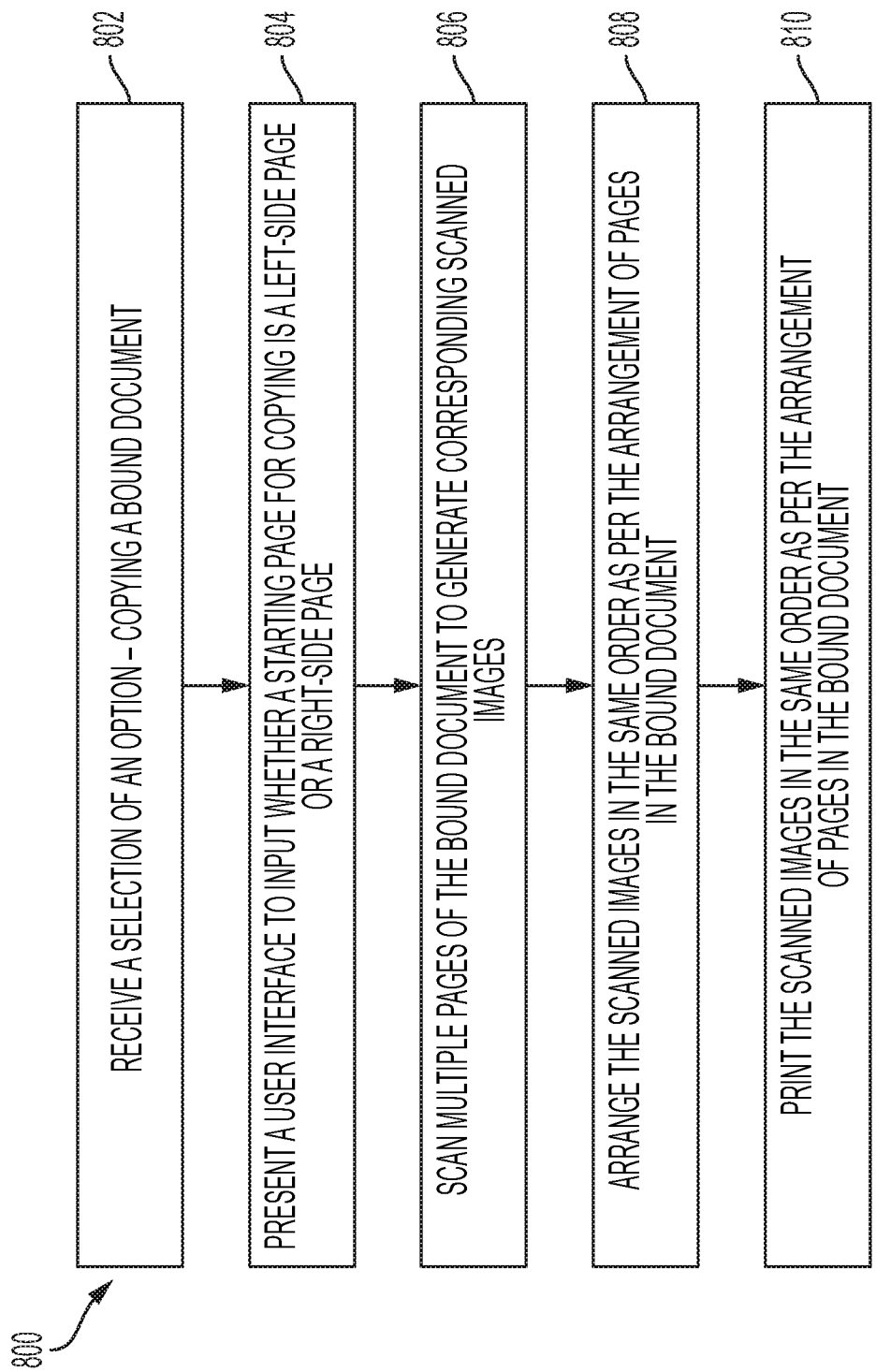
FIG. 8 is a method flowchart for copying a bound document, according to implementation of the present disclosure.

FIG. 8 is a method flowchart 800 for copying a bound document. The method begins when a user wants to create one or more printed copies of the bound document. The user uses a multi-function device to implement the present disclosure. Other equivalent devices such as a copier can be used for implementing the present disclosure.

Initially, the user provides the bound document including a plurality of pages. The user accesses a user interface of the multi-function device and selects an option of copying a bound document through the user interface. At 802, the selection of copying the bound document via the user interface is received. Based on the selection, the user interface is automatically presented to the user to input whether a starting page of the bound document for copying is a left-side page or a right-side page, at 804. Then, multiple pages of the bound document are scanned to generate corresponding scanned images/pages, at 806. A page number is assigned to each scanned image in a consecutive manner.

The generated scanned images are arranged in the same order as per the arrangement of pages in the bound document at 808. The method 800 considers the position of the starting page for scanning and accordingly arranges the scanned images on printing medium.

As a next step, the scanned images are printed in the same order as per the arrangement of pages in the bound document at 810.

For example, the scanned images with page numbers 1 and 2 are arranged on either side of a print medium such as a sheet, if the user inputs that the starting page for copying is the right-side page. Then, the process of arranging the subsequent scanned images on either side of another print medium is continued. For example, if the user input that the starting page for copying is the right-side page, pages 1 and 2 are arranged and consequently printed on either side of a print medium. All the subsequent scanned images with page numbers 3 and 4 are arranged on either side of another print medium, scanned images with page numbers 5 and 6 are arranged on either side of another print medium and so on.

If the user inputs that the starting page for copying is the left-side page, page 1 is arranged and printed on a print medium, the scanned images with page numbers 2 and 3 are arranged and printed on either side of another print medium. Based on the number of scanned images, the method continues arranging the subsequent scanned images on either side of another print medium. In this way, the printed copy of the bound document is generated.

Figure 9A:
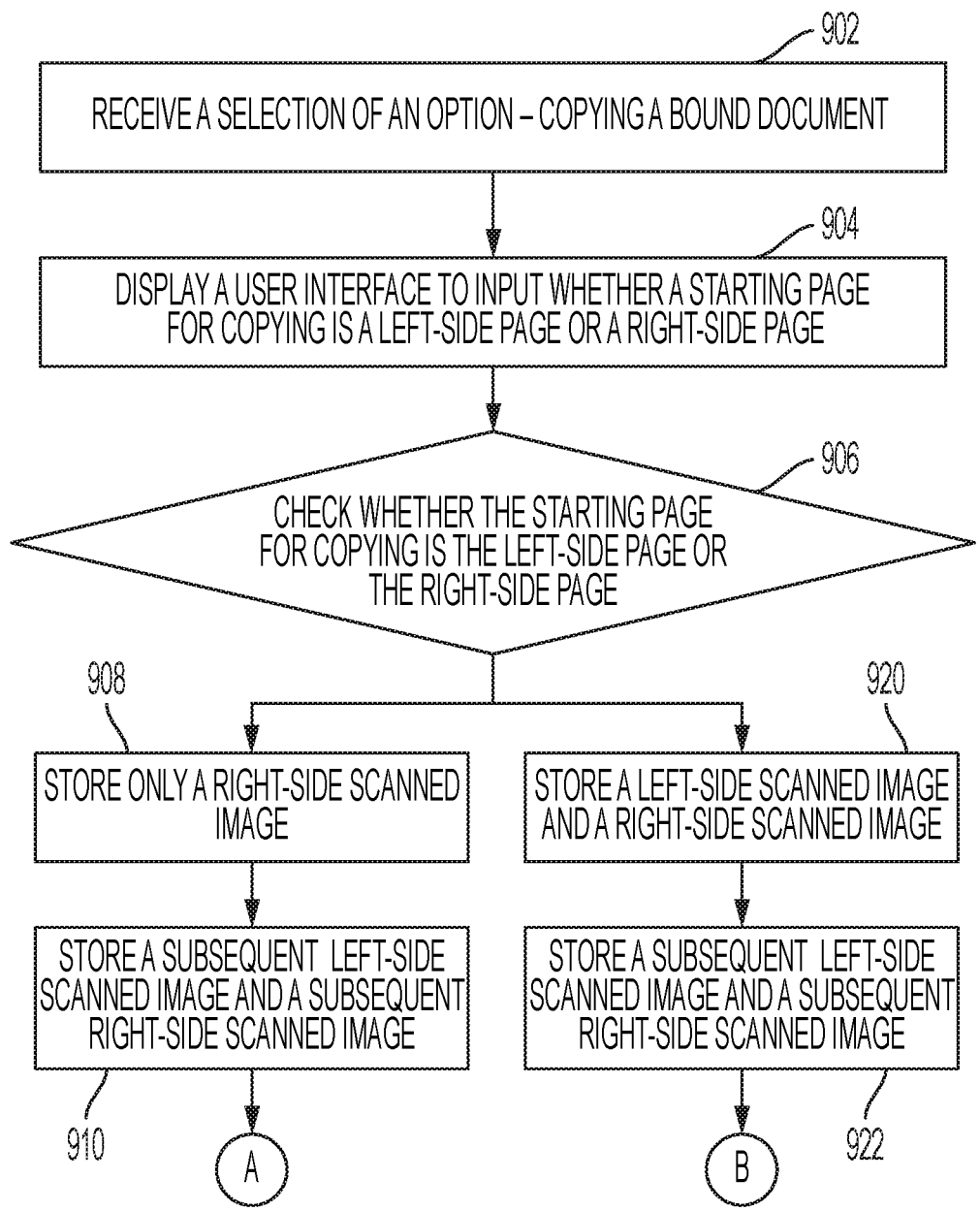
FIGS. 9A and 9B represent a detailed method flowchart for copying a bound document, according to an embodiment of the disclosure.
Figure 9B:
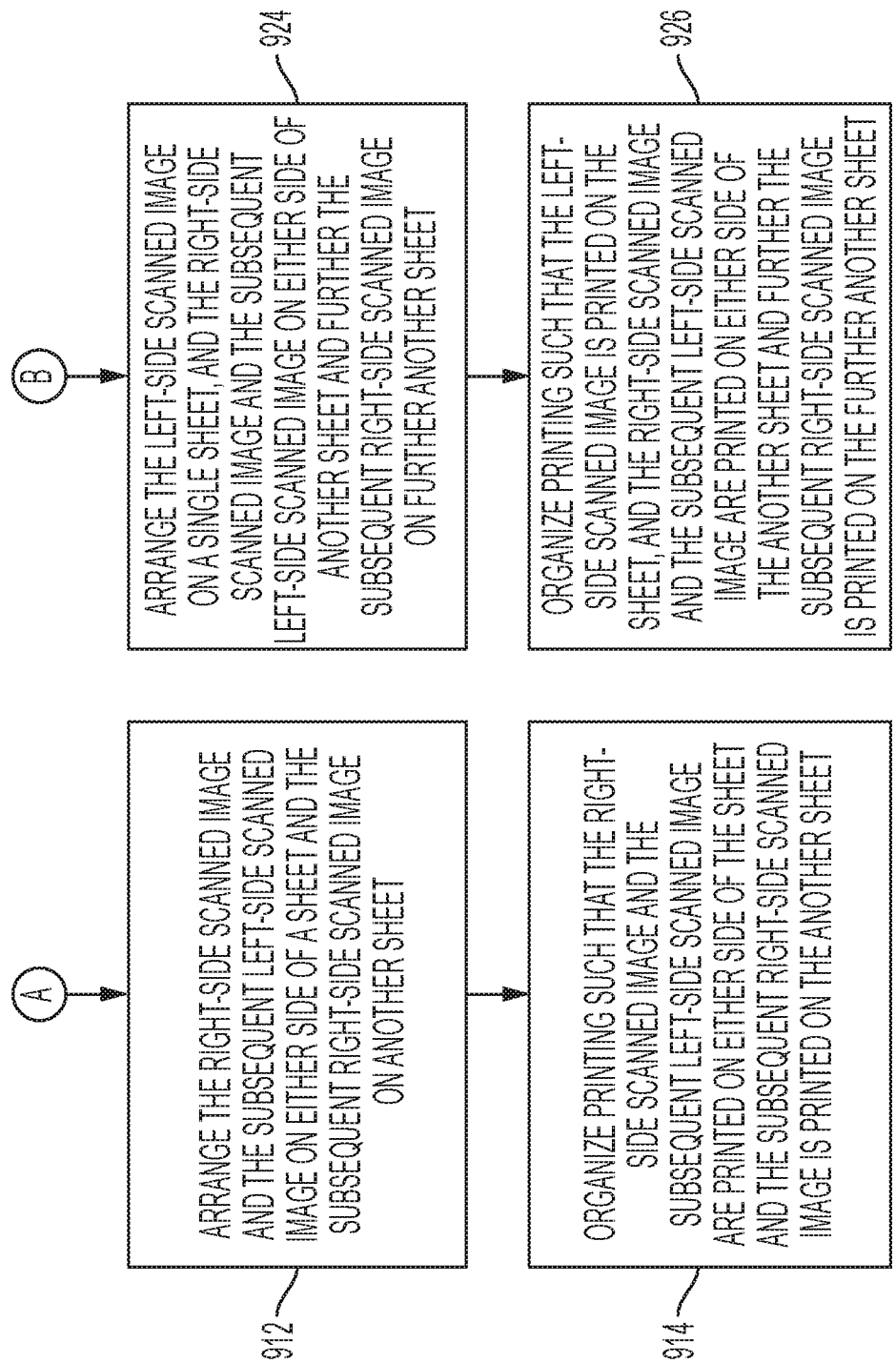

FIGS. 9A and 9B illustrate a detailed method 900 for generating one or more copies of a bound document. The method is explained with respect to a device such as a digital copier, a multi-function device, etc.; however, inputs from a user are also taken.

Initially, the method begins when a user wishes to copy a bound document. The user may want to create one or more copies. A request for copying the bound document is received.

At 902, specifically, a selection of copying the bound document is received via a user interface of the multi-function device. The user selects a specific option "copy bound document" as included/provided in the user interface. The user places the bound document on platen for copying. The bound document on the platen is detected and automatically the user interface is displayed. At 904, the user interface is automatically displayed/presented requesting the user to provide an input if the starting page of the bound document for copying is a left-side page or a right-side page. The user provides his input via the user interface and for further processing, the user input is considered and processed. The input provided by the user is received by the multi-function device and scanning is initiated.

As a next step, the entire area of the bound document covering the left-side page and the right-side page is scanned to generate a single scanned image. Then, the scanned image is divided into two halves; a left-side scanned image and a right-side scanned image corresponding to the left-side page and the right-side page, respectively. The method proceeds further according to the user provided input on the starting page.

At 906, it is checked whether the starting page (provided by the user) for copying is the left-side page or the right-side page. If the user input includes that the starting page for copying is the right-side page of the bound document, the method proceeds with 908, and is executed in the following manner. At 908, only the right-side scanned image is stored, and the left-side scanned image may be discarded or deleted. The right-side scanned image is assigned with a page number 1(n), where value of n starts with 1. The subsequent scanned images have incremental values by 1 similar to page numbers in the bound document.

Then, the user interface is displayed to the user with 2 options—option 1, is to continue scanning the next set of pages and option 2 is to finish scanning. If the user proceeds with the option of continuing scanning the next set of pages, then, a subsequent set of pages of the bound document is scanned to generate a subsequent scanned image. The step of dividing the subsequent scanned image is repeated where the subsequent scanned image is divided into a subsequent left-side scanned image and a subsequent right-side scanned image corresponding to the subsequent left-side page and the subsequent right-side page, respectively. The subsequent left-side scanned image and the subsequent right-side scanned image are stored in the memory at 910. Here, page numbers are assigned to the subsequent scanned images in a consecutive manner. For example, the subsequent left-side scanned image is assigned with page number 2 and the subsequent right-side scanned image is assigned with page number 3. According to the method, a page number to the right-side scanned image is assigned based on 1(n) and a page number to the left-side scanned image is assigned based on (n+1). The value of N is incremented as the methods proceeds with scanning a subsequent set of pages.

The user interface is further displayed to the user with 2 options—option 1, is to continue scanning next set of pages and option 2 is to finish scanning. Based on the user selected option, the method proceeds. The steps of scanning, dividing, storing, assigning page numbers and others are repeated till the user finishes scanning the bound document.

After the user finishes the scanning, at 912, all the subsequent scanned images are arranged such that the right-side scanned image and the subsequent left-side scanned image are arranged on either side of a print medium such as a sheet and the subsequent right-side scanned image is arranged on another print medium such as another sheet. The arrangement of the scanned images is sent for printing and the scanned images are printed according to the arrangement.

At 914, printing is organized such that the right-side scanned image and the subsequent left-side scanned image are printed on either side of a sheet and the subsequent right-side scanned image is printed on another sheet.

In an example, it can be considered that a book has 4 pages and the user has chosen that the starting page for copying is the right-side page. Then, first and second pages are printed on either side of a printing sheet, and the third and fourth pages are printed on either side of another printing sheet. In this manner, the original order of the bound book is maintained in the printed copy as well and therefore, avoids any confusion for the user while referring or reviewing.

Continuing with the description above, If the user input includes the starting page for copying is the left-side page of the bound document, the method proceeds with 920 and is executed in the following manner. At 920, the left-side scanned image and the right-side scanned image are stored. The left-side scanned image is assigned a page number based on 1(n) and the right-side scanned image is assigned a page number (n+1), n has a value 1. The left-side scanned image is assigned with a page number 1 and the right-side scanned image is assigned with page number 2.

Then, the user interface is displayed to the user with 2 options—option 1, is to continue scanning next set of pages and option 2 is to finish scanning. If the user proceeds with the option of continuing scanning next set of pages, then, a subsequent set of pages of the bound document is scanned to generated subsequent scanned images. The step of dividing the subsequent scanned image is repeated where the subsequent scanned image is divided into a subsequent left-side scanned image and a subsequent right-side scanned image corresponding to the subsequent left-side scanned image and the subsequent right-side scanned image, respectively. Here, page numbers are assigned to the subsequent scanned images in a consecutive manner. Page number 3 is assigned to the subsequent left-side scanned image and page number 4 is assigned to the subsequent right-side scanned image. The user interface is displayed again to the user with 2 options—option 1, is to continue scanning next set of pages and option 2 is to finish scanning. Based on the user selected option, the method proceeds. The steps of scanning, dividing, storing, assigning page numbers and others are repeated till the user finishes the scanning. At 922, the subsequent left-side scanned image and the subsequent right-side scanned images are stored.

After the user finishes the scanning, at 924, all the subsequent scanned images are arranged such that the left-side scanned image is arranged on a single sheet, and the right-side scanned image and the subsequent left-side scanned image are arranged on either side of another sheet and further the subsequent right-side scanned image is arranged on further another sheet. The arrangement of the scanned images is sent for printing and the scanned images are printed according to the arrangement.

At 926, printing is organized such that such that the left-side scanned image is printed on a single sheet, and the right-side scanned image and the subsequent left-side scanned image are printed on either side of then another sheet and further the subsequent right-side scanned image is printed on the further another sheet. Finally, a copy of the bound document is generated such that the bound document includes all scanned images in the same order as in the original bound document. The copy of the bound document is a printed bound document.

In an example, it can be considered that a book has 5 pages and the user has chosen that the starting page for copying is the left-side page. Then, only first page is printed on one sheet, second and third pages are printed on either side of a second printing sheet, and the fourth and fifth pages are printed on either side of third printing sheet.

In some implementations, the method includes automatically identifying whether the starting page for copying is the left-side page or the right-side page of the bound document.

The present disclosure provides methods and systems for copying a bound document such as a book. The methods and systems output a printed copy of the bound document such that scanned images/pages are arranged and printed exactly in the same order as in the bound document. The methods and systems consider the position of the starting page of the book, i.e., whether it is on the left or right-side of the book and organize the scanned images in a way that the final printed copy is exactly same as the book. In this manner, the methods and systems improve the workflow of existing book scanning technology and reduce the steps needed to get the printed copy as an output in the same order. Therefore, it becomes easy for customer/users to compile and manage the output copies. As the disclosure provides automatically organized printed sheets, the users can immediately take the organized sheets and bind the sheets. When binded, the printed sheets are in the same order as of the book. Moreover, the improved workflow is applicable for scanning books irrespective whichever side the book starts. Additionally, the methods and systems allow the users to re-construct the original page layout of the bound document and it is possible to flexibly construct page streams from the scanning of books. Meaning that the scanned images are arranged in same order as in the book, and the user doesn't have to manually arrange the paper sheets.

It will be appreciated by a person skilled in the art that the exemplary embodiments are not restricted to any bound document. The embodiments are intended to include or otherwise cover all permutations and combinations of the bound document. Further, implementation of the embodiments may not require any hardware specific changes in multi-function device, because various multi-function device software modules are sufficient in instructing the device according to the methods disclosed herein.

For a person skilled in the art, it is understood that the use of phrase(s) "is," "are," "may," "can," "could," "will," "should" or the like is for understanding various embodiments of the present disclosure and the phrases do not limit the disclosure or its implementation in any manner.

It is emphasized that the term "comprises" or "comprising" is used in this specification to specify the presence of stated features, integers, steps or components, but does not preclude the addition of one or more further features, integers, steps or components, or groups thereof.

The order in which the method is described is not intended to be construed as a limitation and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above described system and/or the apparatus and/or any electronic device (not shown).

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms are deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "scanning," or "copying," or "storing," or "dividing," or "arranging," "or receiving," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices. The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above-disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A multi-function device for copying a bound document, the multi-function device comprising:

a memory for storing a computer readable program code; and a controller for executing the computer readable program code to control the multi-function device, the computer readable program code being configured to cause the multi-function device to execute a process for:
receiving a selection of an option copying the bound document via a user interface of the multi-function device;
automatically presenting the user interface to a user, to input if the starting page of the bound document for copying is a left-side page or a right-side page of the bound document;
scanning a set of pages of the bound document covering the left-side page and the right-side page to generate a scanned image;
dividing the scanned image into a left-side scanned image and a right-side scanned image corresponding to the left-side page and the right-side page, respectively; and
if the user input comprises the starting page for copying is the right-side page of the bound document, execute the process in the following manner:
storing only the right-side scanned image;
assigning the right-side scanned image a page number 1(n), where n has a value of 1;
scanning a subsequent set of pages of the bound document to generate a subsequent scanned image;
dividing the subsequent scanned image into a subsequent left-side scanned image and a subsequent right-side scanned image corresponding to the subsequent left-side page and the subsequent right-side page respectively;
arranging the right-side scanned image and the subsequent left-side scanned image on either side of a single print medium, and the subsequent right-side scanned image on another print medium; and
executing the above process until the user finishes scanning the bound document;
if the user input comprises the starting page for copying is the left-side page of the bound document, execute the process in the following manner:
storing the left-side scanned image and the right-side scanned image;
assigning the left-side scanned image a page number 1(n) and the right-side scanned image a page number as (n+1), where n has a value of 1;
scanning a subsequent set of pages of the bound document to generate a subsequent scanned image;
dividing the subsequent scanned image into a subsequent left-side scanned image and a subsequent right-side scanned image corresponding to the subsequent left-side page and the subsequent right-side page, respectively; and
arranging only the left-side scanned image on a print medium, and the right-side scanned image and the subsequent left-side scanned image on either side of another print medium and the subsequent right-side scanned image on further another print medium; and
repeating the above process until the user finishes scanning the bound document; and generating a copy of the bound document such that the copy of the bound document comprises all scanned images in the same order as in the bound document.

2. The multi-function device of claim 1, further comprising a scanner.

3. The multi-function device of claim 1, wherein the controller is further to assign a page number to the left-side scanned image based on page 1(n) and to assign a page number to the right-side scanned image based on page (n+1), if the user input comprises the starting page for copying is the left-side page of the bound document.

4. The multi-function device of claim 1, wherein the controller is to assign a page number to the right-side scanned image based on page 1(n) and to assign a page number to the subsequent left-side scanned image based page (n+1), if the user input comprises the starting page for copying is the right-side page of the bound document.

5. The multi-function device of claim 1, further comprising a print engine to print the scanned images according to the arrangement.

6. The multi-function device of claim 1, further comprising a print engine for printing the right-side scanned image and the subsequent left-side scanned image on either side of a single print medium, if the starting page for copying is the right-side page.

7. The multi-function device of claim 1 further comprising a print engine for printing the subsequent right-side scanned image on another print medium, if the starting page for copying is the right-side page.

8. The multi-function device of claim 1 further comprising a print engine for printing the left-side scanned image on a print medium, if the starting page for copying is the left-side page.

9. The multi-function device of claim 1 further comprising a print engine for printing the right-side scanned image and the subsequent left-side scanned image on another medium, if the starting page for copying is the left-side page.

10. The multi-function device of claim 1 further comprising a print engine for printing the subsequent right-side scanned image on further another medium, if the starting page for copying is the left-side page.

11. The multi-function device of claim 1, wherein the controller is to automatically identify whether the starting page for copying is the left-side page or the right-side page of the bound document.

12. The multi-function device of claim 1, wherein the controller is to present the user interface to the user with pre-defined options.

13. A method, comprising:
receiving a selection of copying a bound document via a user interface of a multi-function device;
automatically presenting the user interface to a user, to input if the starting page of the bound document for copying is a left-side page or a right-side page of the bound document;
scanning the entire area of the bound document covering the left-side page and the right-side page to generate a scanned image;
dividing the scanned image into a left-side scanned image and a right-side scanned image corresponding to the left-side page and the right-side page, respectively; and
if the user input comprises the starting page for copying is the right-side page of the bound document, execute the process in the following manner:
storing only the right-side scanned image;

assigning the right-side scanned image with a page number 1(n);

scanning a subsequent set of pages of the bound document to generate a subsequent scanned image;

dividing the subsequent scanned image into a subsequent left-side scanned image and a subsequent right-side scanned image corresponding to the subsequent left-side page and the subsequent right-side page, respectively;

arranging the right-side scanned image and the subsequent left-side scanned image on either side of a print medium, and the subsequent right-side scanned image side on another print medium; and repeating the above process until the user finishes scanning the bound document;

if the user input comprises the starting page for copying is the left-side page of the bound document, execute the process in the following manner:

storing the left-side scanned image and the right-side scanned image;

assigning the left-side scanned image a page number 1(n), where n is 1;

scanning a subsequent set of pages of the bound document to generate a subsequent scanned image;

dividing the subsequent scanned image into a subsequent left-side scanned image and a subsequent right-side scanned image corresponding to the subsequent left-side page and the subsequent right-side page, respectively; and arranging the left-side scanned image on a single print medium, and the right-side scanned image and the subsequent left-side scanned image on either side of another print medium and the subsequent right-side scanned image on further print medium; and repeating the above process until the user finishes scanning the bound document; and generating a copy of the bound document such that the bound document comprises all scanned images in the same order as in the original bound document.

14. The method of claim 13, further comprising assigning a page number to the left-side scanned image based on page 1(n) and a page number to the right-side scanned image based on page (n+1), if the user input comprises the starting page for copying is the left-side page of the bound document.

15. The method of claim 13, further comprising assigning a page number to the right-side scanned image based on page 1(n) and the subsequent left-side scanned image based on page (n+1), if the user input comprises the starting page for copying is the right-side page of the bound document.

16. The method of claim 13, further comprising printing the scanned images according to the arrangement.

17. The method of claim 13, further comprising:

printing the right-side scanned image and the subsequent left-side scanned image on either side of a print medium, and printing the subsequent right-side scanned image on another print medium, if the starting page for copying is the right-side page.

18. The method of claim 13, further comprising:

printing the left-side scanned image on a single print medium, printing the right-side scanned image and the subsequent left-side scanned image on either side of another print medium, printing the subsequent right-side scanned image on further print medium, if the starting page for copying is the right-side page.

19. The method of claim 13, further comprising automatically identifying whether the starting page for copying is the left-side page or the right-side page of the bound document.

20. A method, comprising:

receiving a selection of copying a bound document via a user interface;

presenting the user interface to the user to input whether a starting page of the bound document for copying is a left-side page or a right-side page;

scanning multiple pages of the bound document to generate corresponding scanned images;

arranging the scanned images with page numbers 1 and 2 on either side of a print medium, if the user input comprises the starting page for copying is the right-side page; and arranging the generated scanned images in the same order as per the arrangement of pages in the bound document.

21. The method of claim 20, further comprising assigning the page numbers to the scanned images in a consecutive manner.

22. The method of claim 21, further comprising arranging the scanned image with page number 1 on a print medium, and the scanned images with page numbers 2 and 3 on either side of another print medium, if the user input comprises the starting page for copying is the left-side page.

23. The method of claim 22, further comprising continuing arranging the subsequent scanned images on either side of further another print medium.

24. The method of claim 20, further comprising continuing arranging the subsequent scanned images on either side of another print medium, if the user input comprises the starting page for copying is the right-side page.

25. The method of claim 20, further comprising printing the scanned images in the same order as per the arrangement of pages in the bound document.

* * * * *